3,793,342
N-(3,4-DIHYDROXYPHENETHYL)-5-OXO-2-
PYRROLIDINECARBOXAMIDE
Ado Kaiser, Neu-Frenkendorf, Wolfgang Koch, Riehen, Marcel Scheer, Basel, and Uwe Wolcke, Bottmingen, Switzerland, assignors to Hoffmann-La Roche Inc., Nutley, N.J.
No Drawing. Filed Oct. 6, 1971, Ser. No. 187,118
Int. Cl. C07d 27/08
U.S. Cl. 260—326.47         3 Claims

ABSTRACT OF THE DISCLOSURE

Phenethylamide derivatives which are n-substituted with t-alkoxycarbonyl, 5-oxo-2-pyrrolidine carbonyl, phenylsulfonyl or nitrophenylthio and are useful as hypotensive, antipyretic and anti-Parkinson agents.

SUMMARY OF THE INVENTION

In accordance with this invention, it has been discovered that compounds of the formula

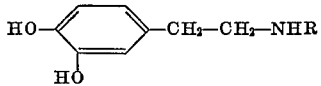

wherein R is lower t-alkoxy-carbonyl, 5-oxo-2-pyrrolidinecarbonyl, phenylsulfonyl, lower alkyl phenylsulfonyl or nitrophenylthio, and pharmaceutically acceptable salts thereof are useful as anti-Parkinson, hypotensive and antipyretic agents.

The compounds of Formula I are prepared by subjecting a boric acid complex of the compound of Formula I to acid hydrolysis.

In accordance with another embodiment of this invention, the compound of Formula I is formed by debenzylating a compound of the formula:

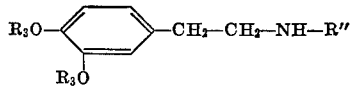

wherein R is lower t-butoxycarbonyl, 5-oxo-2-pyrrolidinecarbonyl, n-benzyloxycarbonyl-5-oxo-2-pyrrolidinecarbonyl, phenylsulfonyl and alkylphenylsulfonyl and $R_3$ is benzyl or by subjecting a compound of the formula:

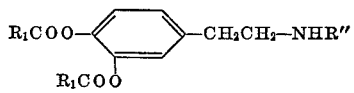

wherein R" is lower t-alkoxycarbonyl and $R_1$ is lower alkyl or phenyl to mild basic hydrolysis. The product formed can be converted into the corresponding salt.

Interesting phenethylamide derivatives of Formula I which are provided by the present invention are:

N-(t-butoxycarbonyl)-dopamide [N-(t-butoxycarbonyl)-N'-(3,4-dihydroxyphenethyl)-amine];
N - (3,4 - dihydroxyphenethyl)-5-oxo-L-2-pyrrolidinecarboxyamide; N-(p-toluenesulphonyl)dopamine; and
N-[(o-nitrophenyl)thio]-dopamine or salts of these compounds.

DETAILED DESCRIPTION OF THE INVENTION

The aforementioned aliphatic groups can be straight-chain or branched-chain. The lower alkyl groups preferably contain up to 7 carbon atoms such as, for example, methyl, isopropyl, n-hexyl or n-heptyl. The lower t-alkoxycarbonyl groups preferably contain up to 8 carbon atoms such as, for example, the t-butoxy carbonyl or t-heptyloxycarbonyl group.

The compounds of Formula I hereinbefore form salts with bases. Such salts include, for example, the disodium, dipotassium and diammonium salts.

In accordance with one embodiment of this invention, the boric acid complex of a compound of Formula I used as the starting material can be prepared as follows:

A solution of dopamine of the formula

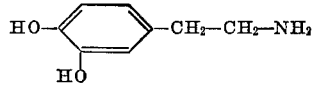

or of a salt thereof is treated with boric acid or a borate salt while maintaining a pH value of at least about 7. Borax is preferably used, although other salts of boric acid such as, for example, the alkali metal metaborates (e.g. sodium metaborate) and alkali metal pentaborates (e.g. potassium pentaborate) can also be used. Water is preferably used as the solvent, although mixtures of water with an inert organic solvent such as, for example, tetrahydrofuran, dioxan, dimethyl sulphoxide or dimethylformamide can also be used. The treatment is preferably carried out at a temperature between about 0° C. and about 70° C. The treatment is preferably carried out while maintaining a pH value of between about 7 and 13; this being expediently effected by the addition of an alkali metal hydroxide such as sodium hydroxide or an organic base such as triethylamine or pyridine.

By treating dopamine or a salt thereof with boric acid or with a borate salt in the manner described earlier there is obtained a boric acid complex of dopamine or of a salt thereof wherein the two phenolic hydroxy groups are esterified with boric acid. This boric acid complex is subsequently reacted with an agent furnishing the acid residue R to yield the desired starting material, i.e. a boric acid complex of a compound of Formula I or of a salt thereof. This reaction can be carried out under the conditions which are usual for acylation reactions. For example, the boric acid complex obtained can be reacted with the corresponding acid halide, preferably with the chloride or bromide, or with the corresponding acid anhydride or acid azide. Where R represents a 5-oxo-2-pyrrolidinecarbonyl group, the boric acid complex can be treated with an activated ester. The acid residue of the activated ester yields the group R which is to be introduced. For example, an ester of 5-oxo-2-pyrrolidine-carboxylic acid with N-hydroxysuccinimide, N-hydroxyphthalimide or p-nitrophenol can be used. The reaction medium, the temperature and the pH for the introduction of the acid residue R are preferably the same as in the preparation of the boric acid complex of dopamine.

The preparation of the boric acid complex of a compound of Formula I is preferably effected in situ starting from dopamine. The boric acid complex of a compound of Formula I obtained is preferably employed directly in solution (i.e. without isolation) in the acidic hydrolysis in accordance with the process provided by the invention.

The acidic hydrolysis of the boric acid complex of a compound of Formula I or of a salt thereof in accordance with one embodiment of the process of this invention is preferably carried out in solution. Preferably, a basic aqueous solution prepared in the manner described earlier is adjusted to a pH value of about 1-4 with an acidic agent. The boric acid complex is thereby cleaved and the desired compound of Formula I is obtained. As acidic agents there are preferably used mineral acids such as sulfuric acid, hydrochloric acid, phosphoric acid etc., although organic acids such as mono- or polybasic alkanecarboxylic acids (e.g. formic acid, acetic acid, trichloroacetic acid, citric acid, tartaric acid and oxalic acid) can also be used. The acidic hydrolysis can be carried out using the same solvents and at the same temperatures as in the preparation of the boric acid complex of dopamine described earlier.

The acidic hydrolysis of the boric acid complex of a compound of Formula I yields in a particularly simple manner the selectively N-acylated (or N-sulphonylated or N-sulphenylated) compounds of Formula I which are unsubstituted at the phenolic hydroxy groups. The phenolic hydroxy groups present in the boric acid complex are protected against attack by the agent furnishing the acid group R as well as to a large extent against oxidation by atmospheric oxygen.

The compounds of Formula II used as starting materials in another embodiment of the present process can be prepared by reacting 3,4-bis(benzyloxy)-phenethylamine or a salt thereof with an agent furnishing the group R'. This reaction can be carried out under the conditions which are usual for acylation reactions. For example, 3,4-bis(benzyloxy)-phenethylamine can be reacted with the corresponding acid halide, preferably with the chloride, or with the corresponding acid azide. Where R' represents a 5-oxo-2-pyrrolidinecarbonyl or N-benzyloxycarbonyl-5-oxo-2-pyrrolidinecarbonyl group, 3,4 - bis(benzyloxy)-phenethylamine can also be reacted with an activated ester. For example, there can be used an ester of 5-oxo-2-pyrrolidinecarboxylic acid or of N-benzyloxycarbonyl-5 - oxo - 2 - pyrrolidinecarboxylic acid with N-hydroxysuccinimide, N-hydroxyphthalimide or p-nitrophenol. These reactions are preferably carried out in organic solvents such as, for example, pyridine, tetrahydrofuran, dimethylformamide or dioxan, if desired in the presence of a basic agent such as, for example, triethylamine or pyridine. Where R' represents a 5-oxo-2-pyrrolidinecarbonyl or N-benzyloxycarbonyl - 5 - oxo-2-pyrrolidinecarbonyl group, 3,4-bis(benzyloxy)-phenethylamine or a salt thereof can also be reacted directly with the corresponding carboxylic acid or a salt thereof in the presence of a dehydrating agent such as, for example, dicyclohexylcarbodiimide or carbonyl-diimidazole, if desired in the presence of a basic agent such as triethylamine or pyridine, to give the desired starting materials of Formula II.

The debenzylation of a starting material of Formula II can be carried out, for example, hydrogenolytically with hydrogen and a hydrogenation catalyst such as platinum, nickel or palladium, if desired in conjunction with a carrier material such as charcoal or barium sulphate. It is preferred to carry out the hydrogenation in an inert solvent; for example, in a lower alkanol (e.g. ethanol), tetrahydrofuran, dimethylformamide, dimethyl sulfoxide or a lower alkanecarboxylic acid (e.g. acetic acid). The hydrogenation is preferably carried out at a temperature of from about 0° C. to 80° C.

Where R' represents a 5-oxo-2-pyrrolidinecarbonyl, N-benzyloxycarbonyl - 5 - oxo-2-pyrrolidinecarbonyl or p-toluene-sulfonyl group, the debenzylation can also be carried out by treatment with trifluoroacetic acid at a temperature between about 20° C. and the boiling point of the mixture.

In the debenzylation of a compound of Formula II, any N-benzyloxycarbonyl - 5 - oxo - 2 - pyrrolidinecarbonyl group R' which may be present is converted into a 5-oxo-2-pyrrolidinecarbonyl group.

The compounds of Formula III used as starting materials in yet another embodiment of the present process can be prepared, for example, by converting a propionic acid derivative of the general formula

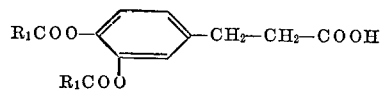

wherein $R_1$ is as above by means of a Hoffman acid amide degradation into a corresponding isocyanate which is subsequently converted into a starting maetrial of Formula III by treatment with t-butanol, if desired in an inert solvent such as tetrahydrofuran, benzene or toluene, at a temperature between 0° C. and the boiling point of the mixture.

The mild basic hydrolysis of a starting material of Formula III is preferably carried out by treating the starting material in water and/or a lower alkanol with an inorganic base such as sodium hydroxide, potassium hydroxide or a quaternary ammonium hydroxide (e.g. tetramethylammonium hydroxide). Generally, it is preferred to use 3–4 mol of the base per mol of starting material of Formula III. The mild base hydrolysis is preferably carried out at a temperature between about 0° C. and 50° C.

The compounds of Formula I hereinbefore contain an acid group R which can be cleaved off under strongly acidic conditions, especially at high temperatures. This acid-sensitivity applies in particular to the lower t-alkoxycarbonyl groups (e.g. the t-butoxycarbonyl group) as well as to the nitrophenylthio groups. With respect to the said acid groups R, attention should therefore be paid in the working-up of the product of the present process that the product is not strongly acidified or strongly acidified and heated, because strongly acidic conditions, especially in conjunction with elevated temperatures, can lead to a partial or complete cleaving-off of this group R with consequential reduction in yield.

The compounds of Formula I hereinbefore and their salts are pharmacodynamically active. They are characterized by manifold actions on the nervous system. In particular, they possess hypotensive, antipyretic and anti-Parkinson properties.

The compounds of Formula I hereinbefore can be used as medicaments; for example, in the form of pharmaceutical preparations which contain them in association with a compatible pharmaceutical carrier. This carrier can be an organic or inorganic inert carrier material which is suitable for enteral or parenteral administration such as, for example, water, gelatin, gum arabic, lactose, starches, magnesium stearate, talc, vegetable oils, polyalkylene glycols, petroleum jelly, etc. The pharmaceutical preparations can be made up in solid form (e.g. as tablets, dragées, suppositories or capsules) or in liquid form (e.g. as solutions, suspensions or emulsions). The preparations may be sterilized and/or may contain adjuvants such as preserving, stabilizing, wetting or emulsifying agents, salts for varying the osmotic pressure or buffers. They can also contain other therapeutically valuable substances.

A pharmaceutical preparation in dosage unit form can expediently contain about 10 mg. to about 1000 mg. of active-ingredient.

The amount of active ingredient to be administered per day depends on the particular case. In general, in the case of oral administration an amount of active ingredient of about 0.1 to about 4 g., especially about 1.5 to about 3 g., will be administered. In the case of intravenous administration, the amount of active ingredient to be administered per day can lie between about 10 mg. and about 2 g., especially about 1 g. The administration is expediently effected in individual doses divided over the day.

The following examples illustrate the process provided by the invention. In the examples concentrated aqueous hydrochloric acid designates an aqueous solution containing 37% by weight hydrochloric acid.

Example 1

5.6 g. of 1-benzyloxycarbonyl-N-[3,4-bis(benzyloxy)-phenethyl]-5-oxo-L-2-pyrrolidinecarboxamide are hydrogenated in the presence of 2 g. of 5% palladium-on-charcoal in 100 ml. of absolute methanol under normal conditions (i.e. at room temperature and atmospheric pressure). The 2.5 g. of N-(3,4-dihydroxyphenethyl)-5-oxo-L-2-pyrrolidinecarboxamide which remain behind after filtering off the catalyst and evaporating the filtrate at 30° C./12 mm. Hg melt at 185°–186° C.

Example 2

A mixture of 7.4 g. of 3,4-dibenzyloxydopamine hydrochloride, 8.9 g. of N-carbobenzoxy-L-pyroglutamic acid dicyclohexylamine salt and 4.12 g. of dicyclohexylcarbodiimide in 120 ml. of absolute tetrahydrofuran and 80 ml. of methylene chloride is stirred at room temperature for 15 hours. The resulting dicyclohexylurea is filtered off. The filtrate is evaporated at 40° C./12 mm. Hg. The residue is taken up in ethyl acetate/methylene chloride (1:1 parts by value) and filtered through 150 g. of Kieselgel. The 1-benzyloxycarbonyl-N-[3,4-bis(benzyloxy)phenethyl]-5-oxo-L-2-pyrrolidinecarboxamide which is isolated from the eluate melts at 140°–145° C. after recrystallization from diethyl ether.

Example 3

14.8 g. of O,O'-dibenzyl-N-toluenesulfonyldopamine are hydrogenated in the presence of 3 g. of 5% palladium-on-charcoal in 300 ml. of absolute methanol under conditions given in Example 1. The N-toluenesulfonyldopamine which is isolated from the hydrogenation solution melts at 128°–129° C.

Example 4

A solution of 3.7 g. of O,O'-dibenzyl-dopamine hydrochloride in 80 ml. of pyridine is treated dropwise at 0° C. with a solution of 2.3 g. of p-toluenesulfonyl chloride in 30 ml. of absolute dioxan. The mixture is stirred at room temperature for 12 hours, then poured onto ice, made Congo-acidic with concentrated aqueous hydrochloric acid and extracted with ethyl acetate. The O,O'-dibenzyl-N-toluenesulfonyldopamine which is obtained from the extract is taken up in diethyl ether and filtered through 30 g. of Kieselgel. The pure compound melts at 101–103° C.

Example 5

An aqueous, alkaline solution containing the boric acid complex of N-t-butoxycarbonyldopamine is made Congo-acidic with 6 N sulfuric acid, with addition of ice in an argon atmosphere, and extracted with ethyl acetate. The ethyl acetate extract is washed successively with water, saturated sodium bicarbonate solution and saturated sodium chloride solution, dried over magnesium sulfate and filtered. The filtrate is evaporated under reduced pressure. N-t-butoxycarbonyldopamine of melting point 136°–137° C. is obtained after recrystallization from ethyl acetate/petroleum ether mixture.

Example 6

58.5 g. of dopamine and 100 g. of borax are dissolved in 500 ml. of water in an argon atmosphere. The solution obtained, which contains the boric acid complex of dopamine, is treated with 6-butoxycarbonyl azide prepared from 60 g. of t-butoxycarbonyl hydrazide. The pH of the solution is held between 9.3 and 9.8 by the simultaneous dropwise addition of ca. 300 ml. of 2 N sodium hydroxide. The reaction mixture is stirred at room temperature for 15 minutes. The aqueous phase, which contains the boric acid complex of N-t-butoxycarbonyldopamine, is used in the process without isolation of the product.

Example 7

An aqueous, alkaline solution containing the boric acid complex of N-[(o-nitrophenyl)thio]-dopamine is acidified to pH 2 with 6 N aqueous sulfuric acid, with ice-cooling in an argon atmosphere and extracted with ethyl acetate. The ethyl acetate extracts are washed with 10% potassium bicarbonate solution and then with saturated sodium chloride solution, dried over sodium sulfate, filtered and evaporated under reduced pressure. O,O'-nitrophenyldisulfide, which is obtained as the by-product, crystallizes out from the resulting dark oil. The remainder of this by-product is separated by chromatography on Kieselgel [eluting agent: toluene-methanol in the ratio 9:1 (v:v)]. The pure N-[(o-nitrophenyl)thio]-dopamine which is obtained is a yellow oil.

Example 8

A suspension of 20 g. of borax in 300 ml. of water and 100 ml. of dioxan is treated in an argon atmosphere with 11.7 g. of dopamine hydrobromide and 25 ml. of 2 N caustic soda. A solution of 10.5 g. of o-nitrophenylsulfenyl chloride in 25 ml. of dioxan is then added dropwise with stirring at room temperature. The pH of the mixture is held between 9.3 and 9.8 by the simultaneous addition of about 30 ml. of 2 N sodium hydroxide. The mixture is subsequently stirred at room temperature for a further 2 hours. The aqueous solution, which contains the boric acid complex of N-[(o-nitrophenyl)thio]-dopamine, is used in the process without isolation of the product.

Example 9

Tablets of the following composition are prepared:

|  | Mg. |
|---|---|
| N-toluenesulfonyl-dopamine | 100 |
| Lactose | 61 |
| Maize starch | 30 |
| Polyvinylpyrrolidone | 4 |
| Talcum | 5 |

The active ingredient is mixed with the lactose and the maize starch and, after the addition of a solution of polyvinylpyrrolidone in 40 ml. of ethanol, granulated. The granulate is dried at 30° C., mixed with talcum and compressed to tablets.

|  | Mg. |
|---|---|
| Individual weight of one tablet | 200 |
| Active ingredient content of one tablet | 100 |

Example 10

Gelatin capsules containing the following ingredients are prepared:

|  | Mg. |
|---|---|
| N-(t-butoxycarbonyl)-dopamine | 50 |
| Mannitol | 98.5 |
| Stearic acid | 1.5 |

The ingredients are homogeneously mixed and filled into interlocking gelatin capsules No. 2 using a capsule filling machine.

|  | Mg. |
|---|---|
| Individual weight of one capsule | 150 |
| Active ingredient content of one capsule | 50 |

What is claimed is:

1. N-(3,4-dihydroxyphenethyl)-5-oxo-L-2-pyrrolidinecarboxamide.
2. The pharmaceutically acceptable salts of N-(3,4-dihydroxyphenethyl)-5-oxo-2-pyrrolidinecarboxamide.
3. N-(3,4-dihydroxyphenethyl)-5-oxo-2-pyrrolidinecarboxamide.

References Cited

Theilheimer; Synthetic Methods of Organic Chemistry (1956), vol. 10, p. 351.

Steinberg: Organoboron Chemistry, vol. 1 (1964), pp. 221, 222, 227, 840–842.

JOSEPH A. NARCAVAGE, Primary Examiner.

U.S. Cl. X.R.

260—462 R, 471 C, 502.3, 551 S, 556 AR; 424—274, 300, 320, 321

UNITED STATES PATENT OFFICE
CERTIFICATE OF CORRECTION

Patent No. 3,793,342   Dated  February 19, 1975

Inventor(s)  Kaiser, Koch, Scheer and Wolcke

It is certified that error appears in the above-identified patent and that said Letters Patent are hereby corrected as shown below:

Column 1, line 8    insert claims priority on October 24, 1973 of Swiss application No. 16044/70 filed October 30, 1970

Signed and sealed this 20th day of May 1975.

(SEAL)
Attest:

RUTH C. MASON
Attesting Officer

C. MARSHALL DANN
Commissioner of Patents
and Trademarks